(12) United States Patent
Yang et al.

(10) Patent No.: US 10,884,275 B2
(45) Date of Patent: Jan. 5, 2021

(54) FIXING MECHANISM AND DISPLAY APPARATUS THEREOF

(71) Applicant: Wistron Corporation, New Taipei (TW)

(72) Inventors: Yao-Chen Yang, New Taipei (TW); Junjie Zhu, New Taipei (TW); Wei-Chia Huang, New Taipei (TW); Chih-Chou Chou, New Taipei (TW); Yougang Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/940,982

(22) Filed: Mar. 30, 2018

(65) Prior Publication Data
US 2019/0250452 A1     Aug. 15, 2019

(30) Foreign Application Priority Data

Feb. 9, 2018   (CN) .......................... 2018 1 0133915

(51) Int. Cl.
*G02F 1/1333*     (2006.01)
*G06F 3/041*      (2006.01)

(52) U.S. Cl.
CPC .... *G02F 1/133308* (2013.01); *G02F 1/13338* (2013.01); *G02F 2001/13332* (2013.01); *G02F 2001/133314* (2013.01); *G02F 2001/133331* (2013.01); *G02F 2202/28* (2013.01); *G06F 3/041* (2013.01); *G06F 2203/04103* (2013.01)

(58) Field of Classification Search
CPC ........... G02F 1/133308; G02F 1/13338; G02F 2001/133314; G02F 2001/13332; G02F 2001/133331; G06F 3/041
See application file for complete search history.

(56) References Cited

U.S. PATENT DOCUMENTS

| | | | |
|---|---|---|---|
| 10,126,579 B2 * | 11/2018 | Dunn | G02F 1/133603 |
| 2011/0116218 A1 * | 5/2011 | Choi | H04N 5/64 361/679.01 |
| 2011/0267314 A1 * | 11/2011 | Huang | G06F 3/0428 345/175 |
| 2012/0120010 A1 * | 5/2012 | Yu | G06F 3/016 345/173 |

(Continued)

FOREIGN PATENT DOCUMENTS

| | | |
|---|---|---|
| CN | 201917889 | 8/2011 |
| CN | 102750049 | 10/2012 |

(Continued)

*Primary Examiner* — Rockshana D Chowdhury
*Assistant Examiner* — Douglas R Burtner
(74) *Attorney, Agent, or Firm* — Winston Hsu (57) ABSTRACT

A display assembling mechanism is applied to a display apparatus. The display assembling mechanism includes a bracket, a front frame and a rear frame. The bracket is configured to accommodate an optical film assembly. The front frame has a main body and a pressing portion connected with each other. A touch module is disposed inside the main body, and the pressing portion is configured to fix an optical component assembly above the bracket. The rear frame is disposed on a side of the bracket opposite to the optical component assembly, and is locked on the front frame to cover the bracket.

18 Claims, 10 Drawing Sheets

(56) References Cited

U.S. PATENT DOCUMENTS

| | | | | |
|---|---|---|---|---|
| 2013/0003339 A1* | 1/2013 | Chen | ............ | A47B 81/06 |
| | | | | 361/807 |
| 2013/0021727 A1* | 1/2013 | Lo | ............ | G02F 1/133308 |
| | | | | 361/679.01 |
| 2013/0038809 A1* | 2/2013 | Hung | ............ | G02F 1/13338 |
| | | | | 349/58 |
| 2013/0077227 A1* | 3/2013 | Chen | ............ | G06F 1/1637 |
| | | | | 361/679.27 |
| 2013/0127743 A1* | 5/2013 | Chen | ............ | G02F 1/133308 |
| | | | | 345/173 |
| 2013/0222344 A1* | 8/2013 | Lu | ............ | G06F 3/0421 |
| | | | | 345/175 |
| 2013/0241879 A1* | 9/2013 | Lu | ............ | G06F 3/0421 |
| | | | | 345/175 |
| 2013/0321741 A1* | 12/2013 | Yuan | ............ | G02B 6/0033 |
| | | | | 349/58 |
| 2014/0016043 A1* | 1/2014 | Chen | ............ | G02F 1/13338 |
| | | | | 349/12 |
| 2014/0029295 A1* | 1/2014 | Hsiao | ............ | G02B 6/0011 |
| | | | | 362/606 |
| 2016/0139442 A1* | 5/2016 | Li | ............ | G06F 3/0416 |
| | | | | 349/12 |
| 2017/0045678 A1* | 2/2017 | Hsu | ............ | G02F 1/1336 |
| 2018/0321779 A1* | 11/2018 | Huang | ............ | G06F 3/0416 |

FOREIGN PATENT DOCUMENTS

| | | |
|---|---|---|
| CN | 202487083 U | 10/2012 |
| CN | 104516593 A | 4/2015 |
| CN | 106648222 A | 5/2017 |
| CN | 206147212 | 5/2017 |
| CN | 107422518 A | 12/2017 |
| TW | 201525812 A | 7/2015 |

* cited by examiner

FIXING MECHANISM AND DISPLAY APPARATUS THEREOF

BACKGROUND OF THE INVENTION

1. Field of the Invention

The present disclosure relates to a display assembling mechanism and a related display apparatus, and more particularly, to a display assembling mechanism and a related display apparatus with narrow and thin structural design.

2. Description of the Prior Art

An infrared touch display disposes an infrared touch module adjacent by a display panel. Apiece of transparent glass is arranged on the display panel, and a reflection strip and a transparent strip are disposed on an edge of the transparent glass. The conventional infrared touch display utilizes a front frame and a bracket to fix the display panel. The bracket and the infrared touch module are disposed on a supporter, and the transparent glass is overlapped above the infrared touch module, so that the transparent glass is spaced from the display panel. Then, a decorative front frame, a decorative side bar, and a rear casing are configured to cover the supporter for completing the manufacture of the infrared touch display. Therefore, the conventional infrared touch display has plenty of structural components; for instance, the supporter is disposed around a rim of the display panel, and the decorative front frame and the decorative side bar are further disposed around the supporter, so the conventional infrared touch display has drawbacks of huge sizes and heavy weight, and is out of a trend of the thin and narrow border display.

SUMMARY OF THE INVENTION

The present disclosure provides a display assembling mechanism and a related display apparatus with narrow and thin structural design for solving above drawbacks.

According to the claimed disclosure, a display assembling mechanism includes a bracket, a front frame and a rear frame. The bracket is configured to accommodate an optical film assembly. The front frame is disposed around lateral sides of the bracket. The front frame includes a main body and a pressing portion connected with each other. The main body is configured to accommodate a touch module, and the pressing portion is configured to fix an optical component assembly on the bracket. The rear frame is disposed on a side of the bracket opposite to the optical component assembly, and locked with the front frame to cover the bracket.

According to the claimed disclosure, a display apparatus includes an optical film assembly, an optical component assembly, a touch module and a display assembling mechanism. The display assembling mechanism includes a bracket, a front frame and a rear frame. The bracket is configured to accommodate an optical film assembly. The front frame is disposed around lateral sides of the bracket. The front frame includes a main body and a pressing portion connected with each other. The main body is configured to accommodate a touch module, and the pressing portion is configured to fix an optical component assembly on the bracket. The rear frame is disposed on a side of the bracket opposite to the optical component assembly, and locked with the front frame to cover the bracket.

The display assembling mechanism of the present disclosure can connect the optical film assembly, the optical component assembly, and the touch module in the inner fixing manner. The optical film assembly and the optical component assembly are respectively disposed on the opposite sides of the restricting portion of the bracket, and the gap can be formed between the optical film assembly and the optical component assembly due to a thickness of the restricting portion. The accommodating structure for accommodating the touch module is disposed on the outer of the bracket. An outer wall of the accommodating structure may be stretched outwardly to be a main structure of the front frame, and further may be stretched upwardly to be the engaging portion and the pressing portion. The optical component assembly is inserted into the engaging portion to avoid lateral shaking. The pressing portion presses the optical component assembly onto the positioning structure and the bracket or the joint section of the second accommodating structure to avoid upward and downward shaking. The rear frame and the front frame may be connected and matched with the optical component assembly to cover the optical film assembly and the touch module.

The present disclosure can utilize the front frame of the display assembling mechanism to fix the touch module, install the reflective surface structure, clip the transparent component, and decorate and cover the display apparatus. The bracket of the display assembling mechanism can dispose the optical film assembly and the liquid crystal panel respectively on the opposite sides of the restricting portion, to abut the liquid crystal panel against the transparent glass to achieve a non-gap design. Accordingly, a reflection coating may be disposed between the liquid crystal panel and the transparent glass to prevent Newton's rings (such as an optical interference phenomenon). In addition, the rear frame of the display assembling mechanism can be configured to strengthen structural stability of the front frame and the bracket, so as to effectively enhance integrated strength of the display apparatus with the narrow border design. The display assembling mechanism of the present disclosure can assemble the display apparatus with the narrow and thin structural design, the non-gap design, and have advantages, such as, convenient assembly and artistic appearance.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 1 to FIG. 5. FIG. 1 to FIG. 5 are diagrams of a display apparatus 10 in different assembling modes according to a first embodiment of the present disclosure. The display apparatus 10 includes an optical film assembly 12, an optical component assembly 14, a touch module 16, and a display assembling mechanism 18. The optical film assembly 12 may be a backlight module of a display panel, and may include a polarizer, a filter, a liquid crystal laminate, and a light guiding plate. The optical component assembly 14 may include a piece of transparent glass 20 and a liquid crystal panel 22. An annular adhesive may be disposed on an edge of a surface on the liquid crystal panel 22, and the liquid crystal panel 22 is adhered to the transparent glass 20 via the annular adhesive. The touch module 16 may be an infrared touch module adapted to output an infrared optical detection signal, and further receive and analyze an obstruction result of the infrared optical detection signal to determine a touch position and a moving trace about an external object. Components of the display assembling mechanism 18 are gathered to reduce volume of the display apparatus 10 for conforming to a trend of narrow border design.

In one embodiment, the display assembling mechanism 18 may include a bracket 24, a front frame 26, and a rear frame 28. The bracket 24 has a slab portion 29, a base portion 30, and a restricting portion 32 connected with each other. The base portion 30 is disposed between the slab portion 29 and the restricting portion 32. The base portion 30 may be monolithically integrated with the restricting portion 32 and detachably fixed onto the slab portion 29. The bracket 24 is configured to accommodate the optical film assembly 12. The front frame 26 is disposed around lateral sides of the bracket 24. The front frame 26 may include a main body 34, a pressing portion 36, and an engaging portion 38. The touch module 16 is disposed inside the main body 34. The engaging portion 38 is disposed between the main body 34 and the pressing portion 36. The engaging portion 38 may be inserted by an edge of the optical component assembly 14. The pressing portion 36 is configured to press the optical component assembly 14 engaged with the engaging portion 38, such that, the optical component assembly 14 can be fixed onto the restricting portion 32 of the bracket 24. The pressing portion 36 may include a reflective surface structure 361 and a constraining structure 362 disposed adjacent by each other. The constraining structure 362 may press the transparent component 40 onto the optical component assembly 14. The reflective surface structure 361 is configured to turn a transmission direction of the optical detection signal, which means a direction of the infrared optical detection signal output by the touch module 16 may be changed by the reflective surface structure 361 and may pass through the transparent component 40.

The main body 34 of the front frame 26 may include a first accommodating structure 42 and a positioning structure 44. The positioning structure 44 is disposed on the optical component assembly 14 and abuts against the slab portion 29 of the bracket 24. For example, the positioning structure 44 can be a U-typed structure, which has a first section 441, a second section 442, and a third section 443 adjacent by each other. The first section 441 and the third section 443 are respectively connected to two ends of the second section 442 to form the U-typed structure. When the first section 441 is connected to the optical component assembly 14 by adhesive or a locking component, the second section 442 is fixed on the slab portion 29 of the bracket 24, and the third section 443 can be locked by the rear frame 28 so as to abut the rear frame 28 against the third section 443. The first accommodating structure 42 is detachably engaged between the first section 441 and the third section 443 of the positioning structure 44. The touch module 16 is installed inside the first accommodating structure 42. It should be mentioned that the engaging portion 38 may be outwardly stretched from an edge of the first accommodating structure 42, and the engaging portion 38 is configured to locate the optical component assembly 14 in a front of a detection surface of the touch module 16. The pressing portion 36 may be outwardly stretched from the first accommodating structure 42, and configured to press the optical component assembly 14 onto the positioning structure 44 tightly via the transparent component 40.

Figure 2:
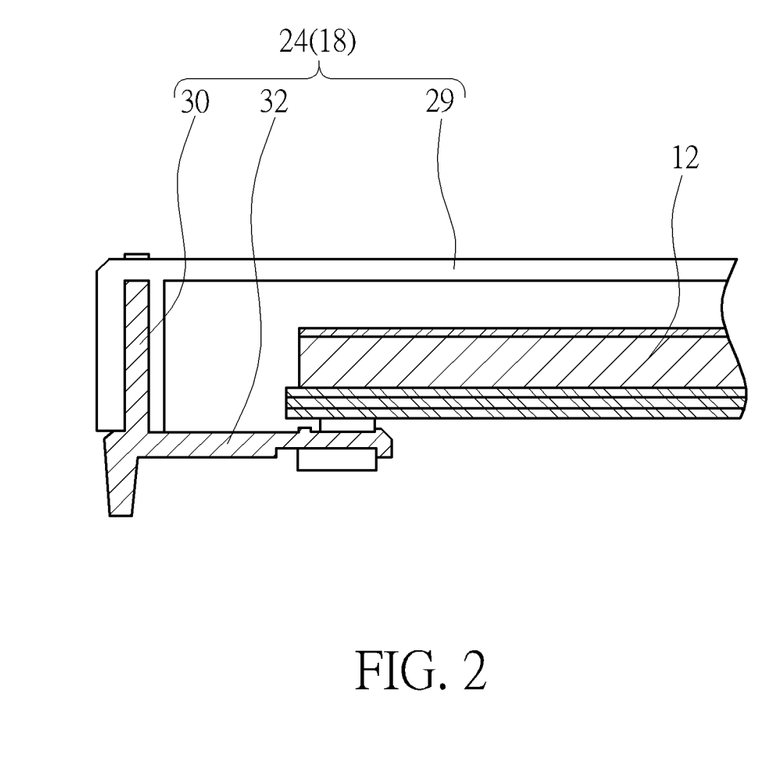
Figure 3:
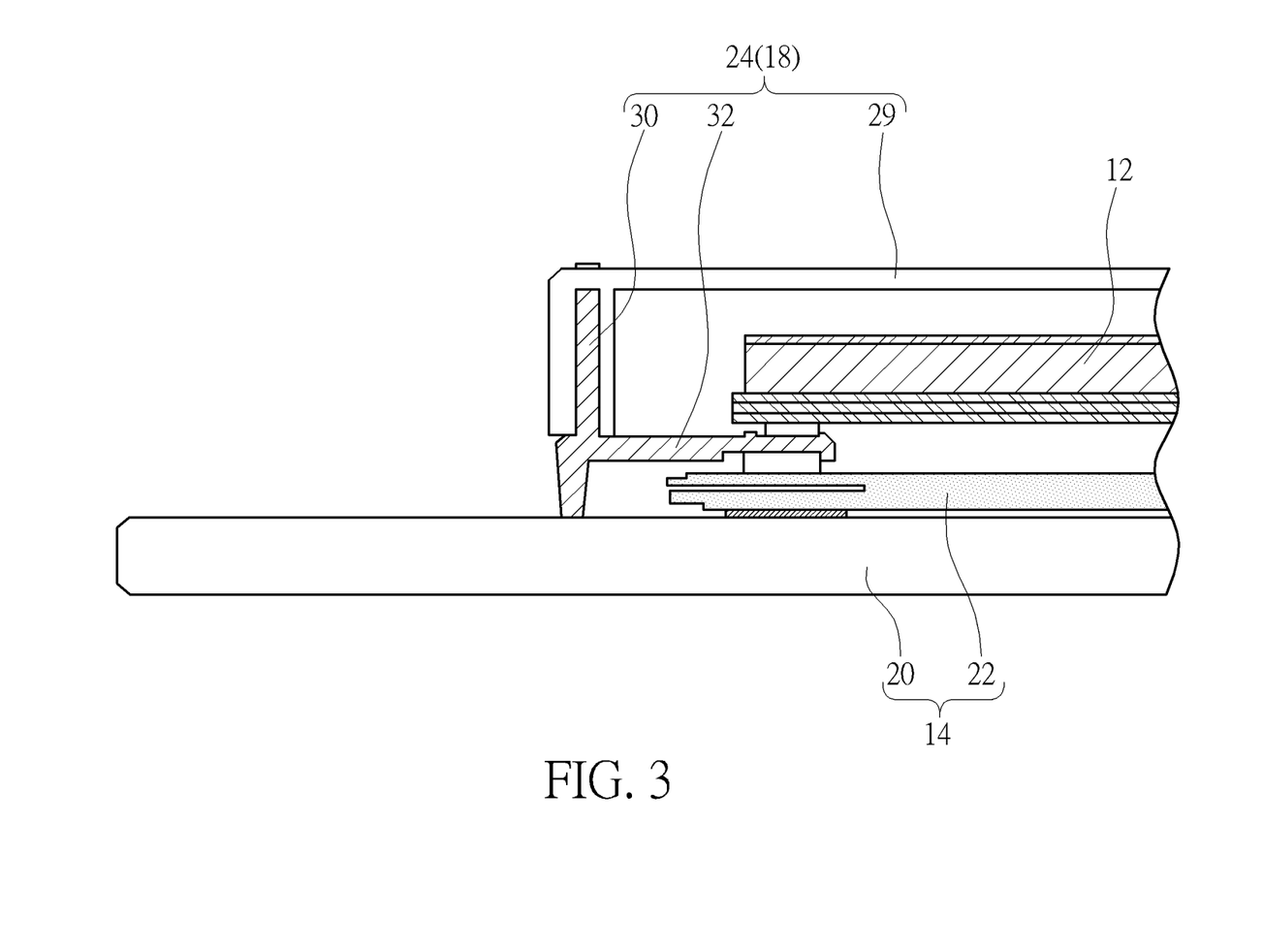
Figure 4:
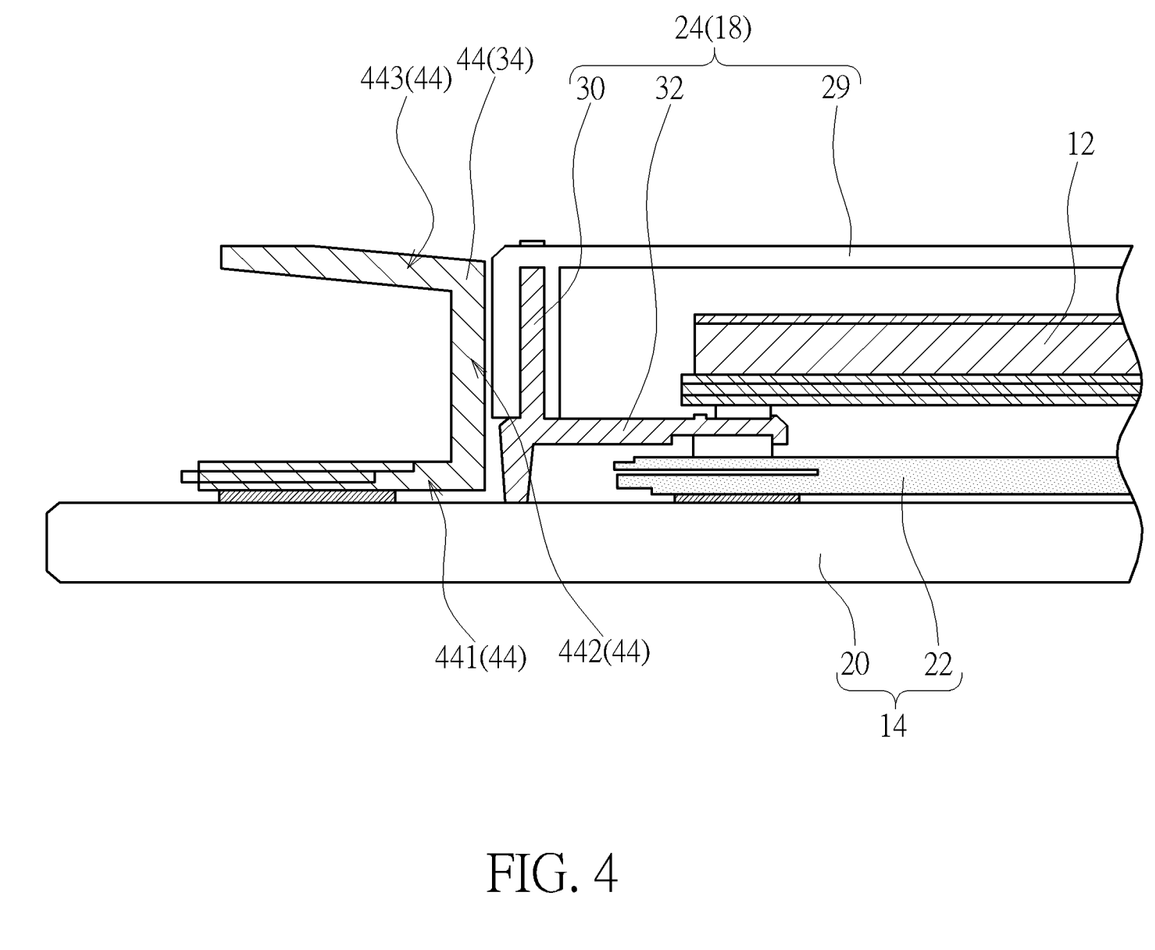

According to assembling procedure of the display apparatus 10 in the first embodiment, the optical film assembly 12 is gathered to install on a side of the restricting portion 32 of the bracket 24, as shown in FIG. 2. Then, the transparent glass 20 is adhered to the liquid crystal panel 22 via the annular adhesive to form the optical component assembly 14, which means there is no gap existing between the transparent glass 20 and the liquid crystal panel 22. The optical component assembly 14 may be installed on the other side of the restricting portion 32 opposite to the optical film assembly 12, as shown in FIG. 3. Meanwhile, the edge of the optical component assembly 14 may protrude out of the bracket 24, such that the optical detection signal output from the touch module 16 can pass through the said edge and be projected onto the reflective surface structure 361 of the pressing portion 36. As shown in FIG. 4, the first section 441 of the positioning structure 44 can be disposed on the optical component assembly 14 via the adhesive, such that, the second section 442 can abut against the slab portion 29 of the bracket 24 and be fixed onto the bracket 24 in a screw locking manner (not shown in figures).

Figure 1:
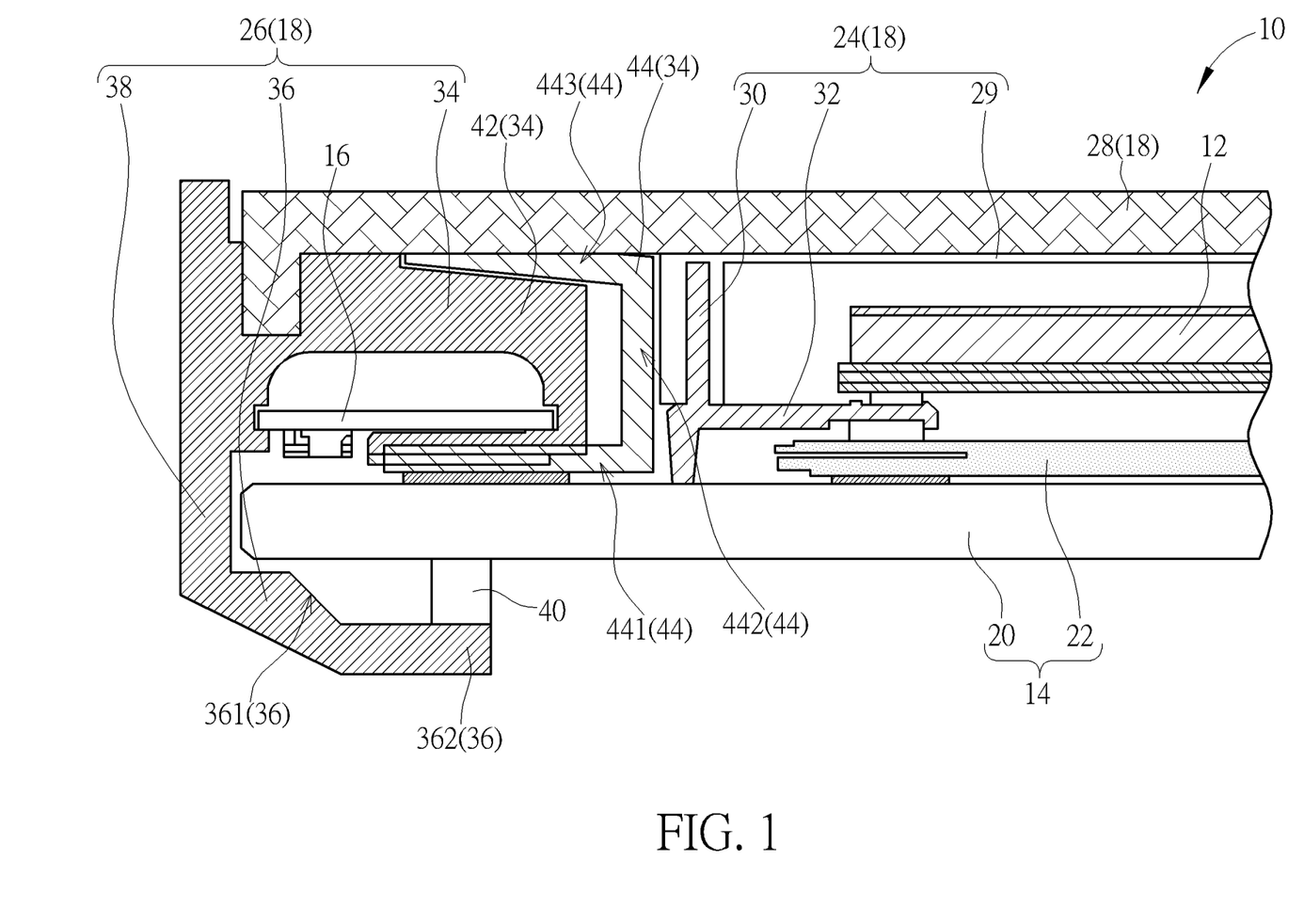
FIG. 1 to FIG. 5 are diagrams of a display apparatus in different assembling modes according to a first embodiment of the present disclosure.
Figure 5:
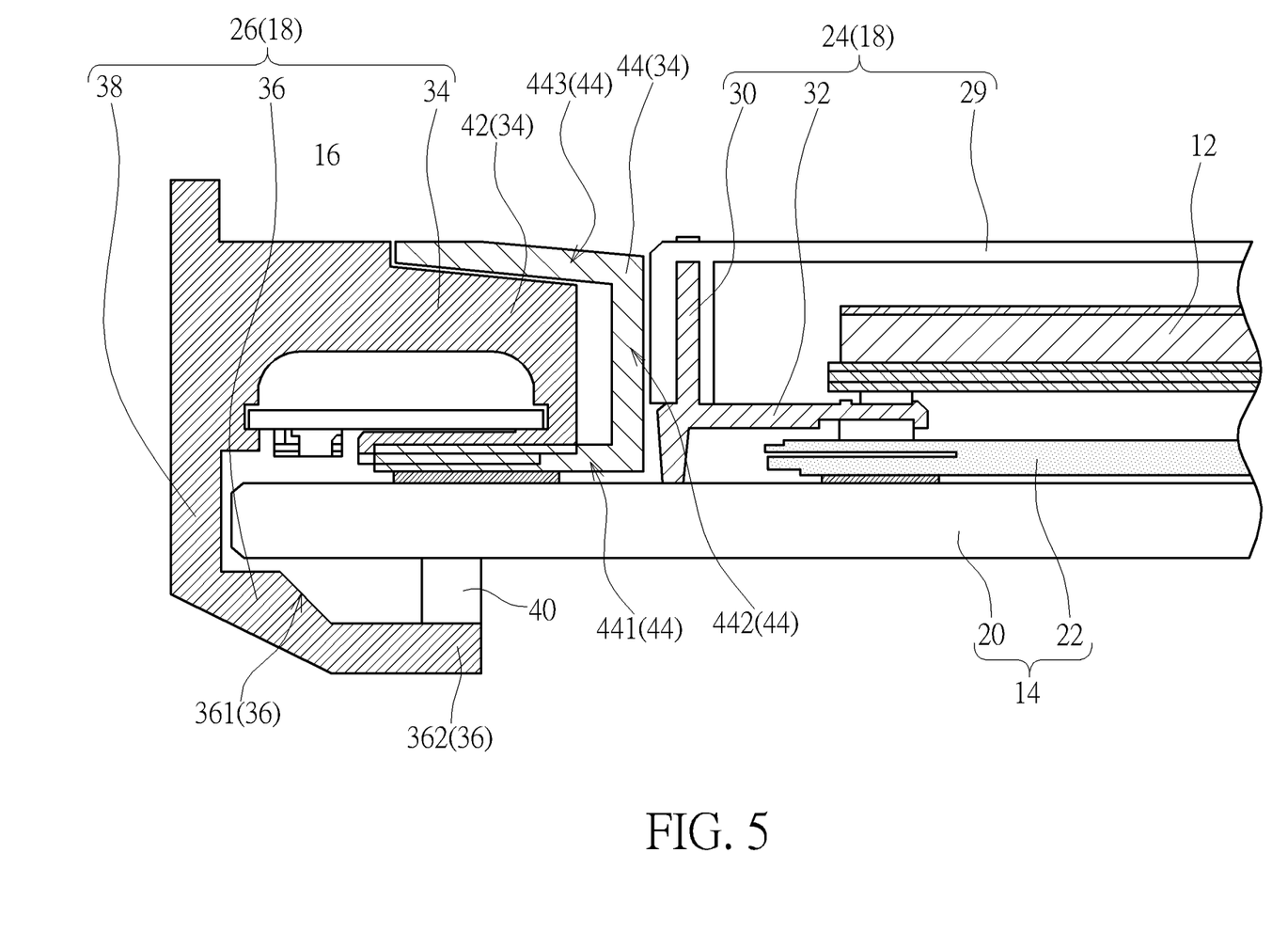

The touch module 16 is installed inside the first accommodating structure 42, and the front frame 26 can be connected to the optical component assembly 14 by a lateral side of the front frame 26. The first accommodating structure 42 is engaged with the positioning structure 44, such that, the edge of the optical component assembly 14 may be inserted into the engaging portion 38 and the transparent component 40 may be pressed onto the optical component assembly 14 by the constraining structure 362, so as to ensure that the optical component assembly 14 can be stably clipped between the bracket 24 and the front frame 26, as shown in FIG. 5. In the meantime, the reflective surface structure 361 is located at a signal transmitting and receiving path of the touch module 16. The direction of the optical detection signal output from the touch module 16 may be changed by the reflective surface structure 361. The optical detection signal may pass through the transparent component 40 and may be distributed above the optical component assembly 14. Final, the rear frame 28 is disposed on a side of the bracket 24 opposite to the optical component assembly 14. An outer structure of the rear frame 28 is engaged with the first accommodating structure 42, and an inner structure of the rear frame 28 is locked onto the positioning structure 44 via the locking component, such as, a screw or a bolt, such that, the bracket 24 can be fully enclosed by the front frame 26 and the rear frame 28, as shown in FIG. 1.

Please refer to FIG. 6 to FIG. 10. FIG. 6 to FIG. 10 are diagrams of the display apparatus 10' in different assembling modes according to a second embodiment of the present disclosure. In the second embodiment, elements having the same numerals as ones of the first embodiment have the same structures and functions, and a detailed description is herein for simplicity. Difference between the said two embodiments is: the front frame 26' of the display apparatus 10' may include the pressing portion 36 and the engaging portion 38 outwardly stretched from the main body 34', and the main body 34' may include a second accommodating structure 46 and a bridging structure 48. The bridging structure 48 can be connected to the second accommodating structure 46 via the screw. The touch module 16 is installed inside the second accommodating structure 46. The second accommodating structure 46 is further configured to hold the optical component assembly 14, and the optical component assembly 14 can be spaced from the optical film assembly 12. The bridging structure 48 is connected to the second accommodating structure 46 and the pressing portion 36, which means the pressing portion 36 may be outwardly stretched from the bridging structure 48, and the optical component assembly 14 can be fixed onto the second accommodating structure 46 by the transparent component 40.

In the second embodiment, sizes of the slab portion 29' of the bracket 24' are enlarged, and the base portion 30' is disposed on a non-edge region of the slab portion 29', which means a gap is formed between the base portion 30' and an edge of the slab portion 29'. The base portion 30' and the restricting portion 32' may be monolithically integrated with each other and connected to the slab portion 29' in a detachable manner. The second accommodating structure 46 of the main body 34' is located at the gap formed between the base portion 30' and the edge of the slab portion 29'. The second accommodating structure 46 and the bridging structure 48 of the main body 34' are respectively located at two opposite sides of the slab portion 29' of the bracket 24'. The enlarged slab portion 29' is not only configured to accommodate the optical film assembly 12, but also provide a chamber to store the second accommodating structure 46. The second accommodating structure 46 may include a slot section 50 and a joint section 52 connected to each other. The edge of the touch module 16 is inserted into the slot section 50 and the touch module 16 is installed inside the second accommodating structure 46. The joint section 52 can be stretched from a lateral side of the slot section 50, which means the joint section 52 is connected to the slot section 50 for connecting and holding the optical component assembly 14. The touch module 16 can output the optical detection signal, and the joint section 52 is located out of the signal transmitting and receiving path of the touch module 16, that is, the joint section 52 does not obstruct in a front of the touch module 16.

Figure 7:
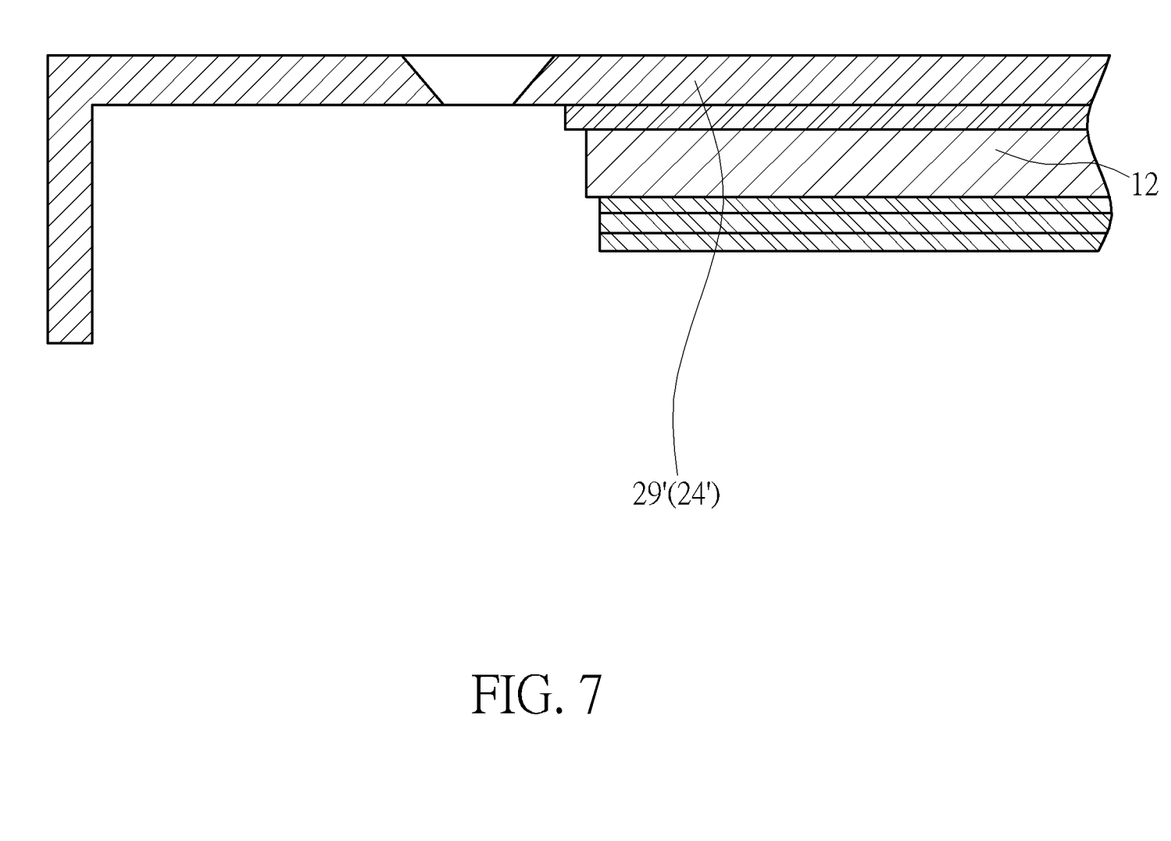
Figure 8:
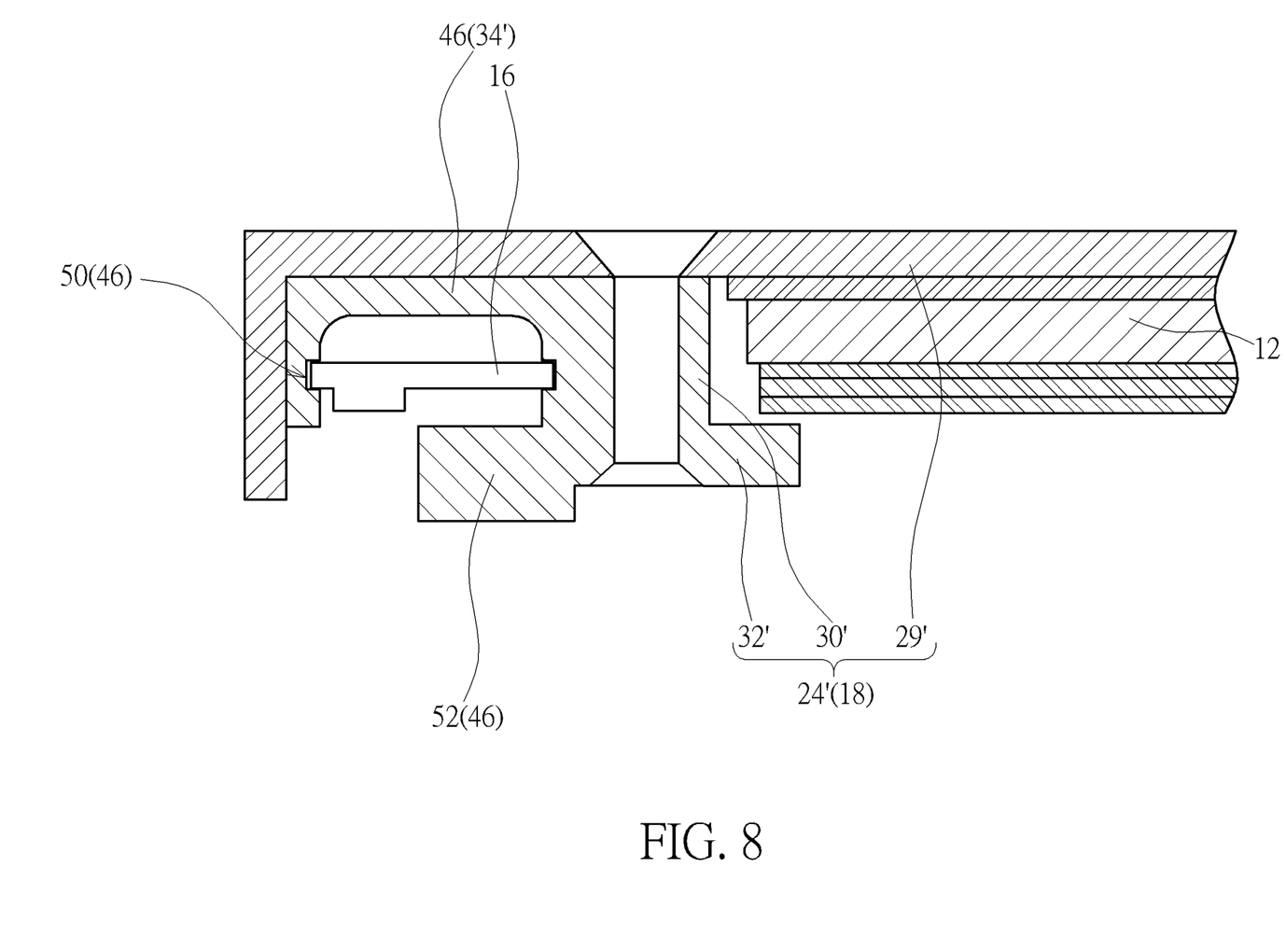
Figure 9:
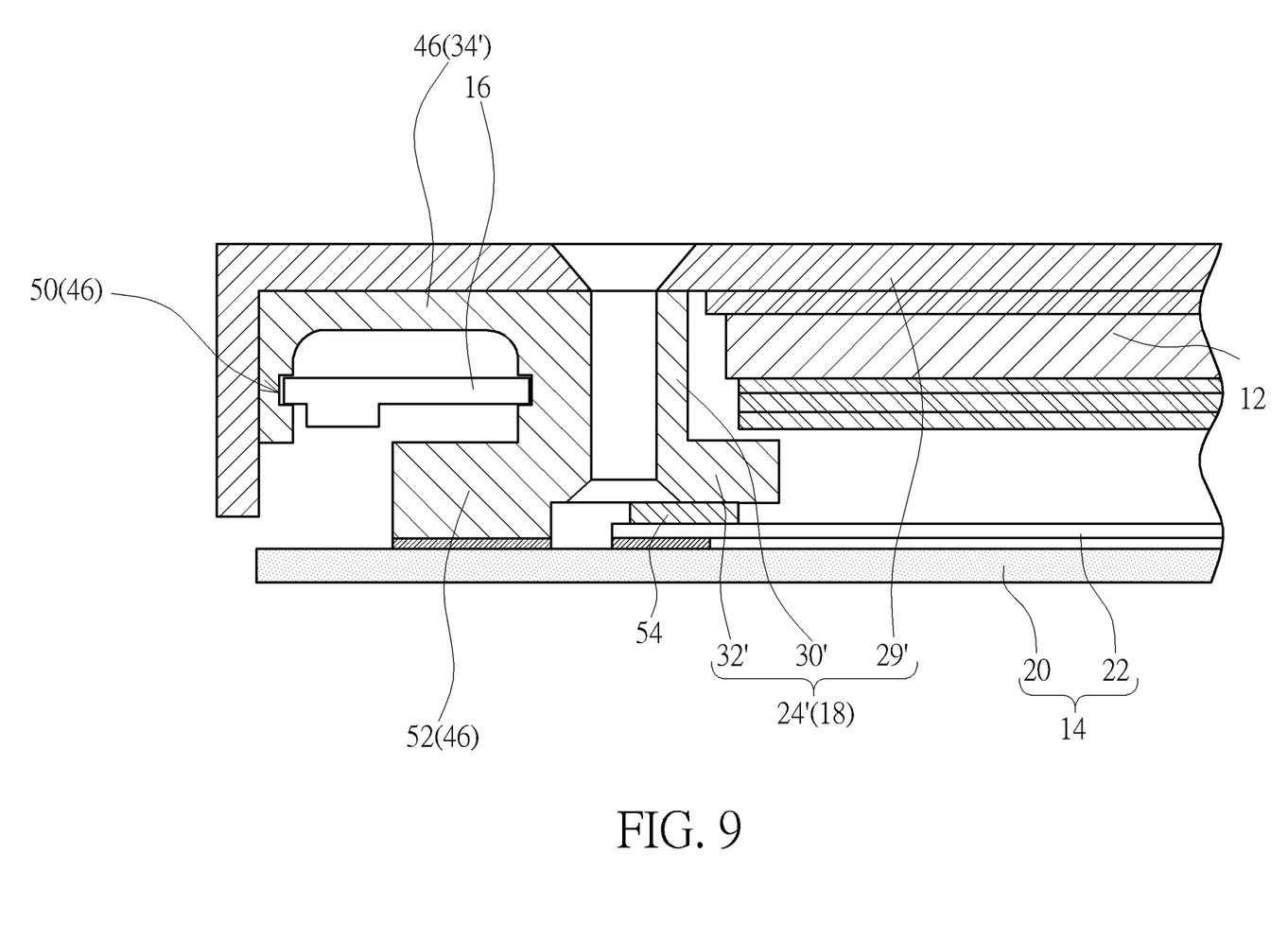

According to the assembling procedure of the display apparatus 10' in the second embodiment, the optical film assembly 12 is installed on the slab portion 29' of the bracket 24', as shown in FIG. 7. Then, the touch module 16 is disposed inside the second accommodating structure 46, and the second accommodating structure 46 is located at a region of the slab portion 29' adjacent by the optical film assembly 12, as shown in FIG. 8. A partial structure (such as a right-side structure) of the second accommodating structure 46 can be regarded as the restricting portion 32' of the bracket 24'. In a possible embodiment of the present disclosure, the base portion 30' and the restricting portion 32' are monolithically integrated with the second accommodating structure 46 and disposed on the slab portion 29' accordingly. In another possible embodiment of the present disclosure, the restricting portion 32' is separated from the second accommodating structure 46. For example, the base portion 30' and the second accommodating structure 46 can be fixed on the slab portion 29' via the screw or the bolt. The transparent glass 20 is adhered to the liquid crystal panel 22 via the annular adhesive to form the optical component assembly 14, and the optical component assembly also can be adhered to the joint section 52 of the second accommodating structure 46. As shown in FIG. 9, the optical film assembly 12 and the optical component assembly 14 are respectively located at two opposite sides of the restricting portion 32'. A buffering component 54 can be optionally disposed between the restricting portion 32' and the optical component assembly 14. The buffering component 54 can be made of soft material with resilient deformable property, such as the sponge or the rubber. Two edges of the optical component assembly 14 respectively abut against the joint section 52. The buffering component 54 can provide buffer and resilient recovering function if a central region of the optical component assembly 14 is pressed, so as to protect the optical component assembly 14 from over-pressure.

Figure 6:
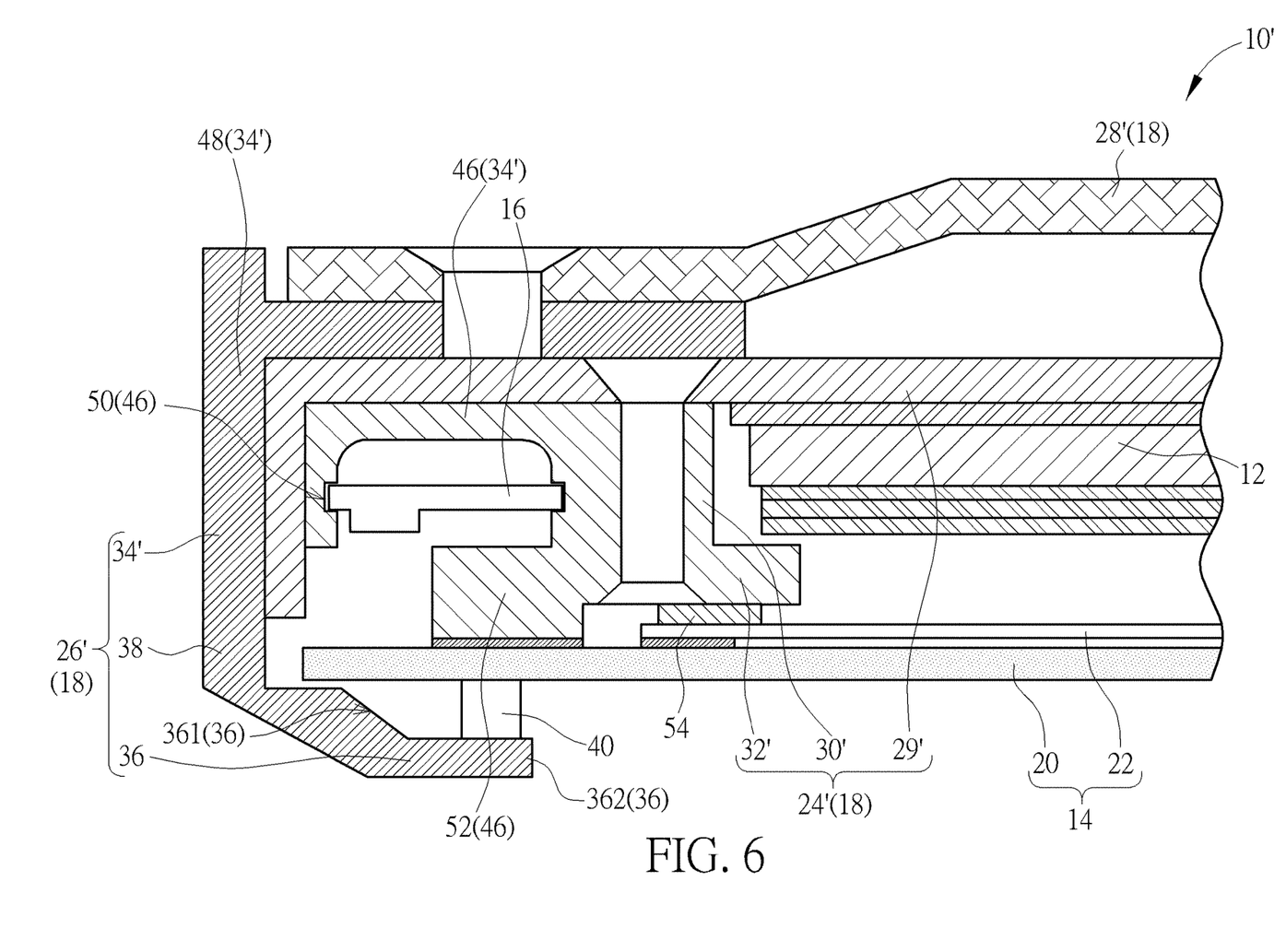
FIG. 6 to FIG. 10 are diagrams of the display apparatus in different assembling modes according to a second embodiment of the present disclosure.
Figure 10:
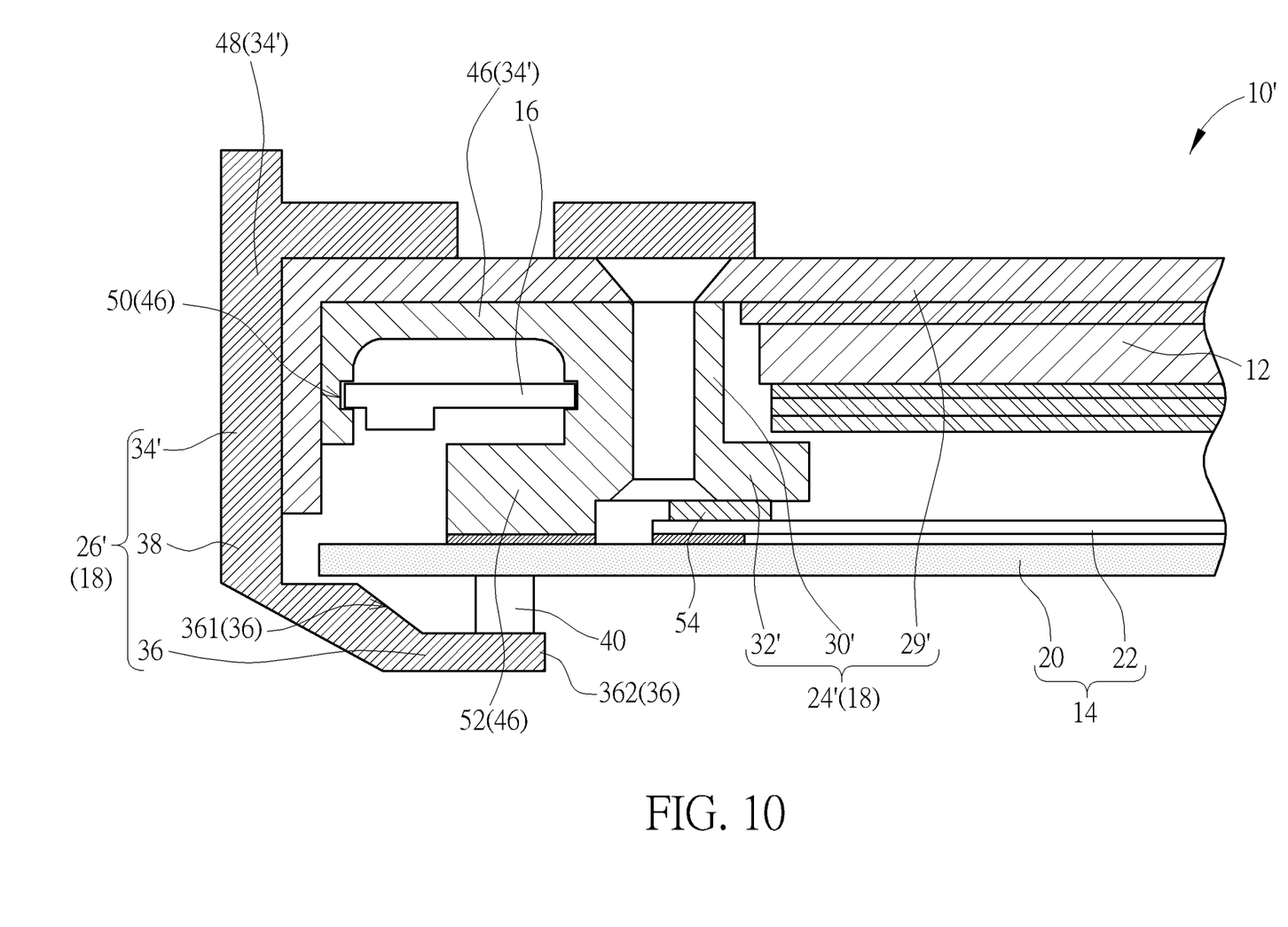

The front frame 26' is installed on the bracket 24'. The bridging structure 48 of the main body 34' can abut against a rim of the slab portion 29', and a bottom of the bridging structure 48 can be locked onto the slab portion 29' via the screw or the bolt. The engaging portion 38 can be disposed on the top of the bridging structure 48, and the pressing portion 36 can be outwardly stretched from the engaging portion 38. When the bridging structure 48 abuts against the slab portion 29', the edge of the optical component assembly 14 is inserted into the engaging portion 38, and the pressing portion 36 can press over the optical component assembly 14 through the transparent component 40, so as to tightly clip the optical component assembly 14 between the bracket 24' and the front frame 26', as shown in FIG. 10. The pressing portion 36 has the reflective surface structure 361 and the constraining structure 362. The constraining structure 362 is configured to press the transparent component 40 onto the optical component assembly 14. The transmission direction of the optical detection signal can be changed by the reflective surface structure 361, and the optical detection signal may be transmitted between the touch module 16 and the transparent component 40 back and forth. The rear frame 28' is disposed on the side of the bracket 24' opposite to a side of the optical component assembly 14, and the bracket 24' is covered between the front frame 26' and the rear frame 28'. The rear frame 28' may be fixed on the bottom of the bridging structure 48 of the front frame 26' in a locking manner, as shown in FIG. 6.

The display assembling mechanism of the present disclosure can connect the optical film assembly, the optical component assembly, and the touch module in an inner fixing manner. The optical film assembly and the optical component assembly are respectively disposed on the opposite sides of the restricting portion of the bracket, and the gap can be formed between the optical film assembly and the optical component assembly due to a thickness of the restricting portion. The accommodating structure for accommodating the touch module is disposed on the outer of the bracket. An outer wall of the accommodating structure may be stretched outwardly to be a main structure of the front frame, and further may be stretched upwardly to be the engaging portion and the pressing portion. The optical component assembly is inserted into the engaging portion to avoid lateral shaking. The pressing portion presses the optical component assembly onto the positioning structure and the bracket or the joint section of the second accommodating structure to avoid upward and downward shaking. The rear frame and the front frame may be connected and matched with the optical component assembly to cover the optical film assembly and the touch module.

In conclusion, the present disclosure can utilize the front frame of the display assembling mechanism to fix the touch module, install the reflective surface structure, clip the transparent component, and decorate and cover the display apparatus. The bracket of the display assembling mechanism can dispose the optical film assembly and the liquid crystal panel respectively on the opposite sides of the restricting portion, to abut the liquid crystal panel against the transparent glass to achieve a non-gap design.

Accordingly, a reflection coating may be disposed between the liquid crystal panel and the transparent glass to prevent Newton's rings (such as an optical interference phenomenon). In addition, the rear frame of the display assembling mechanism can be configured to strengthen structural stability of the front frame and the bracket, so as to effectively enhance integrated strength of the display apparatus with the narrow border design. Comparing to prior art, the display assembling mechanism of the present disclosure can assemble the display apparatus with the narrow and thin structural design, the non-gap design, and have advantages, such as, convenient assembly and artistic appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display assembling mechanism, comprising:
    a bracket configured to accommodate an optical film assembly;
    a front frame disposed around lateral sides of the bracket, the front frame comprising a main body and a pressing portion connected with each other, the main body being configured to accommodate a touch module, and the pressing portion being configured to fix an optical component assembly on the bracket; and
    a rear frame disposed on a side of the bracket opposite to the optical component assembly, and locked with the front frame to cover the bracket;
    wherein the pressing portion comprises a reflective surface structure and a constraining structure, the constraining structure is configured to press a transparent component on the optical component assembly, the reflective surface structure is disposed adjacent by the constraining structure to change a transmission direction of an optical detection signal, such that, the optical detection signal is transmitted between the transparent component and the touch module.

2. The display assembling mechanism of claim 1, wherein the optical component assembly comprises a piece of transparent glass and a liquid crystal panel, an edge of the liquid crystal panel is pasted on the transparent glass via an annular adhesive.

3. The display assembling mechanism of claim 1, wherein the bracket comprises a slab portion, a base portion, and a restricting portion, the base portion is connected between the slab portion and the restricting portion, the slab portion is connected to the front frame, the optical film assembly and the optical component assembly are respectively located at two opposite sides of the restricting portion.

4. The display assembling mechanism of claim 1, wherein the front frame further comprises an engaging portion disposed between the main body and the pressing portion, an edge of the optical component assembly is inserted into the engaging portion and fixed between the pressing portion and the bracket.

5. The display assembling mechanism of claim 1, wherein the main body of the front frame comprises a first accommodating structure and a positioning structure, the positioning structure is connected to the bracket and the optical component assembly, the first accommodating structure is engaged with the positioning structure and the touch module is disposed inside the first accommodating structure.

6. The display assembling mechanism of claim 5, wherein the pressing portion is outwardly stretched from the first accommodating structure to press the optical component assembly on the positioning structure.

7. The display assembling mechanism of claim 5, wherein the positioning structure is a U-typed structure, the U-typed structure comprises a first section, a second section, and a third section connected with each other, the first section and the third section are respectively connected to two ends of the second section, the second section is connected to the bracket, and the first accommodating structure is engaged between the first section and the third section.

8. The display assembling mechanism of claim 7, wherein the optical component assembly is connected to the first section and the bracket abuts against the third section.

9. The display assembling mechanism of claim 1, wherein the main body of the front frame comprises a second accommodating structure and a bridging structure, the bridging structure is disposed between the second accommodating structure and the pressing portion, the second accommodating structure is connected to the optical component assembly, and the touch module is disposed inside the second accommodating structure.

10. The display assembling mechanism of claim 9, wherein the pressing portion is outwardly stretched from the bridging structure to press the optical component assembly on the second accommodating structure.

11. The display assembling mechanism of claim 9, wherein the second accommodating structure comprises a slot section and a joint section connected with each other, the touch module is inserted into the slot section, the joint section is connected to the slot section for connecting the optical component assembly, and the joint section is located out of a signal transmitting and receiving path of the touch module.

12. A display apparatus, comprising:
    an optical film assembly;
    an optical component assembly;
    a touch module; and
    a display assembling mechanism, comprising:
        a bracket configured to accommodate the optical film assembly;
        a front frame disposed around lateral sides of the bracket, the front frame comprising a main body and a pressing portion connected with each other, the main body being configured to accommodate the touch module, and the pressing portion being configured to fix the optical component assembly on the bracket; and
        a rear frame disposed on a side of the bracket opposite to the optical component assembly and locked with the front frame to cover the bracket;
        wherein the pressing portion comprises a reflective surface structure and a constraining structure, the constraining structure is configured to press a transparent component on the optical component assembly, the reflective surface structure is disposed adjacent by the constraining structure to change a transmission direction of an optical detection signal, such that, the optical detection signal is transmitted between the transparent component and the touch module.

13. The display apparatus of claim 12, wherein the optical component assembly comprises a piece of transparent glass and a liquid crystal panel, an edge of the liquid crystal panel is pasted on the transparent glass via an annular adhesive.

14. The display apparatus of claim 12, wherein the bracket comprises a slab portion, a base portion, and a restricting portion, the base portion is connected between the slab portion and the restricting portion, the slab portion is connected to the front frame, the optical film assembly and the optical component assembly are respectively located at two opposite sides of the restricting portion.

15. The display apparatus of claim 12, wherein the front frame further comprises an engaging portion disposed between the main body and the pressing portion, an edge of the optical component assembly is inserted into the engaging portion and fixed between the pressing portion and the bracket.

16. The display apparatus of claim 12, wherein the main body of the front frame comprises a first accommodating structure and a positioning structure, the positioning structure is connected to the bracket and the optical component assembly, the first accommodating structure is engaged with the positioning structure, the touch module is disposed inside the first accommodating structure, the positioning structure is a U-typed structure, the U-typed structure comprises a first section, a second section and a third section connected with each other, the first section and the third section are respectively connected to two ends of the second section, the second section is connected to the bracket, and the first accommodating structure is engaged between the first section and the third section, the optical component assembly is connected to the first section, and the bracket abuts against the third section.

17. The display apparatus of claim 16, wherein the pressing portion is outwardly stretched from the first accommodating structure to press the optical component assembly on the positioning structure.

18. The display apparatus of claim 12, wherein the main body of the front frame comprises a second accommodating structure and a bridging structure, the bridging structure is disposed between the second accommodating structure and the pressing portion, the second accommodating structure is connected to the optical component assembly, the touch module is disposed inside the second accommodating structure, the pressing portion is outwardly stretched from the bridging structure to press the optical component assembly on the second accommodating structure, the second accommodating structure comprises a slot section and a joint section connected with each other, the touch module is inserted into the slot section, the joint section is connected to the slot section for connecting the optical component assembly, and the joint section is located out of a signal transmitting and receiving path of the touch module.

* * * * *